No. 719,970. PATENTED FEB. 3, 1903.
W. R. WOOD.
VEHICLE WHEEL.
APPLICATION FILED DEC. 5, 1902.
NO MODEL.
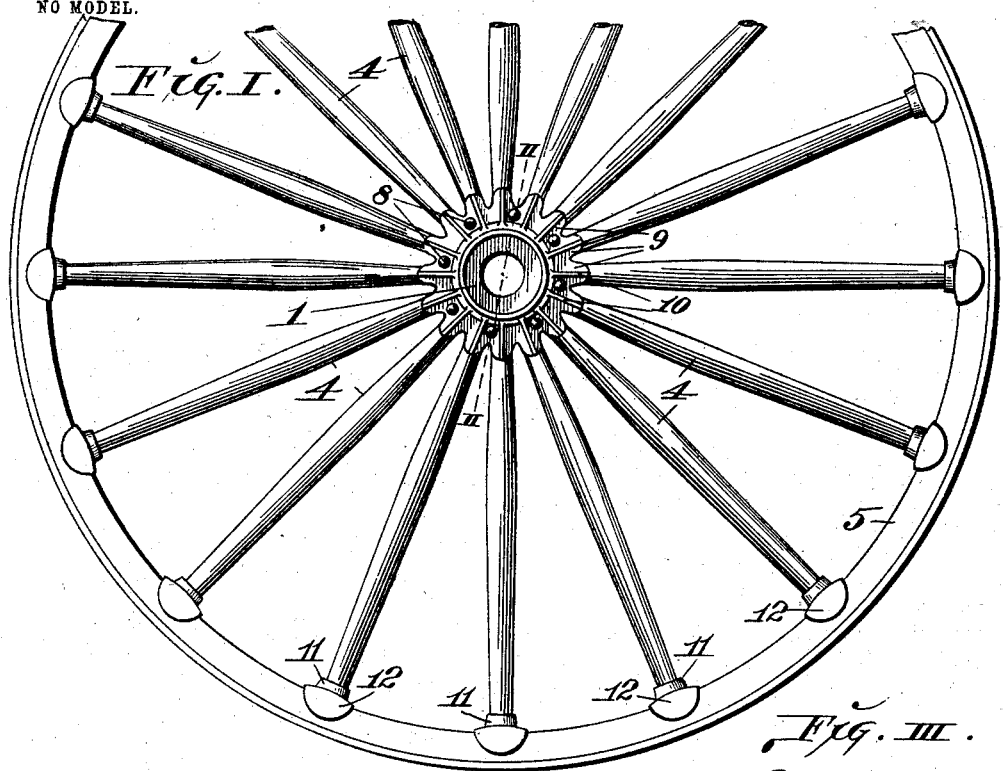
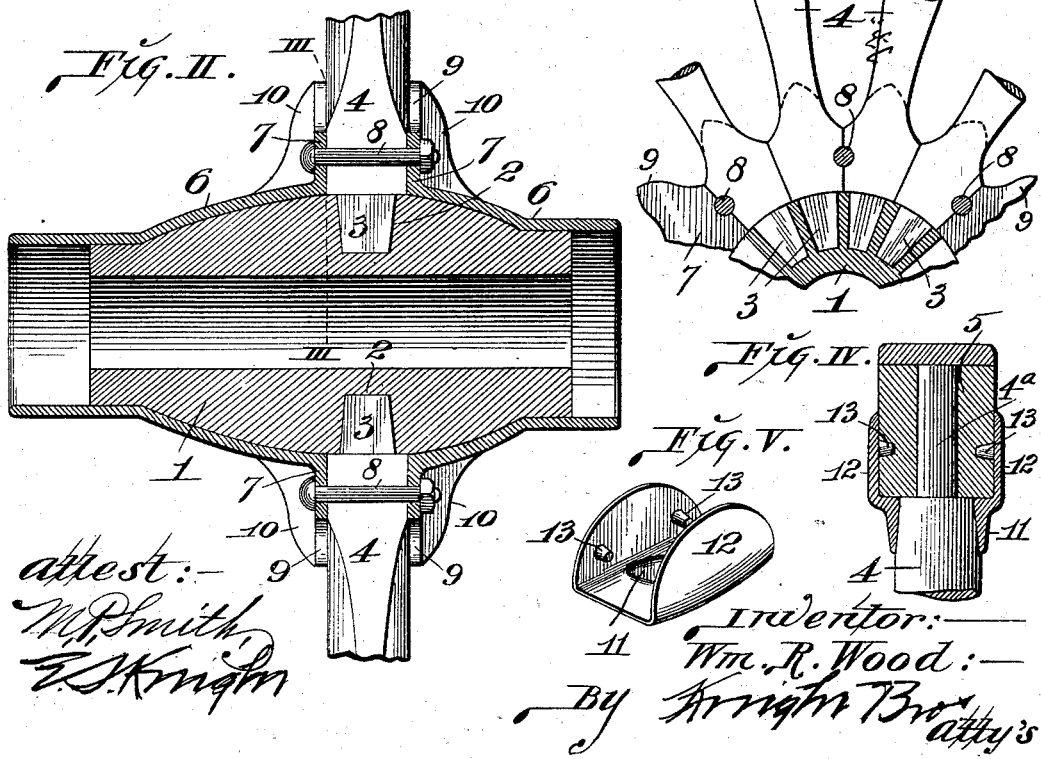

UNITED STATES PATENT OFFICE.

WILLIAM R. WOOD, OF ST. LOUIS, MISSOURI.

VEHICLE-WHEEL.

SPECIFICATION forming part of Letters Patent No. 719,970, dated February 3, 1903.

Application filed December 5, 1902. Serial No. 133,984. (No model.)

*To all whom it may concern:*

Be it known that I, WILLIAM R. WOOD, a citizen of the United States, residing in the city of St. Louis, in the State of Missouri, have invented certain new and useful Improvements in Vehicle-Wheels, of which the following is a full, clear, and exact description, reference being had to the accompanying drawings, forming part of this specification.

My invention relates to an improvement in the construction of vehicle-wheels embodying wooden spokes and fellies; and it has for its object a wheel construction in which greater strength and durability are provided between the inner ends of the spokes and the hubs and the outer ends of the spokes and the fellies.

The invention consists in features of novelty hereinafter fully described, and pointed out in the claim.

Figure I is a side view of a vehicle-wheel constructed in accordance with my invention. Fig. II is an enlarged section taken on line II II, Fig. I. Fig. III is a section taken on line III III, Fig. II. Fig. IV is a section taken through the felly of the wheel at the location of one of the spokes. Fig. V is a perspective view of one of the ferrule-clips applied to the outer ends of the spokes and the felly.

1 designates the hub of the vehicle-wheel, provided with sockets 2, that receive the tenons 3 at the inner ends of the spokes 4.

5 is the felly of the wheel.

6 designates sleeves fitted to and inclosing the hub 1 at both sides of the inner ends of shoulders of the spokes 4, as seen most clearly in Fig. II. Each of the sleeves 6 is formed with an annular flange 7, between which the inner shoulders of the spokes are seated, the flanges being held tightly to the spokes by tie bolts or rivets 8, that pass through the flanges and between the spokes, as seen in Figs. II and III. The flanges 7 are scalloped or provided with notches at their edges, thereby producing wings 9, that extend radially from the bodies of the flanges in positions corresponding to the spokes 4, so as to rest against the sides of the inner ends of the spokes. In the position stated the wings brace the spokes from each side in a manner to prevent their tenons at the inner ends from being broken by lateral strain exerted upon the spokes in the use of the wheel.

10 designates reinforcing-ribs formed integral with the sleeves 6, flanges 7, and wings 9, as seen in Figs. I and II, and by which the flanges and wings are very materially strengthened to resist any strain to which they may be subjected in the use of the wheel.

11 designates ferrule-clips the necks of which are fitted to the outer ends of the spokes 4, as seen most clearly in Fig. IV. Each of the clips 11 has a pair of arms 12, that embrace the sides of the felly 5, thereby, in connection with the necks of the clips, securely holding the outer ends of the spokes to the felly and avoiding all liability of the spoke-tenons 4$^a$, seated in the felly, being broken off by lateral strain incurred in the use of the wheel and also preventing splitting of the felly.

13 represents studs projecting from the inside faces of the clip-arms 12, (see Figs. IV and V,) and seated in the sides of the felly 5, where they serve to hold the clips 11 firmly to the felly after they have been applied to the spokes and felly. The necks of the ferrule-clips 11 are tapered interiorly, as seen in Fig. IV, being narrowest at their bases. The object of so forming these members is to cause them to compress the outer ends of the spokes when the ferrules are driven thereonto, and thereby increasing the density of the spokes at their ends to give them additional strength to resist any strain to which they may be subjected.

I claim as my invention—

In a vehicle-wheel, the combination of a hub and spokes, sleeves fitted to said hub, flanges carried by said sleeves, wings carried by said flanges to bear against the sides of said spokes, and reinforcing-ribs arranged to strengthen said wings, substantially as set forth.

WILLIAM R. WOOD.

In presence of—
 N. V. ALEXANDER,
 M. P. SMITH.